United States Patent Office 3,255,080
Patented June 7, 1966

3,255,080
LIVE RABIES VIRUS VACCINE AND METHOD FOR THE PRODUCTION THEREOF
Jerrell B. Emery, Zionsville, Ind., assignor to The Dow Chemical Company, Midland, Mich., a corporation of Delaware
No Drawing. Filed Aug. 6, 1962, Ser. No. 214,854
10 Claims. (Cl. 167—78)

This invention is concerned with the preparation of live modified rabies virus and is particularly directed to a novel method for propagating live modified rabies virus by a tissue culture technique and to an improved vaccine produced by such method.

The classical method for preparing rabies vaccine involves propagation of the rabies virus in living mammals such as rabbits. After the virus is "fixed" by serial passage through rabbits, for example, infected nervous tissue, such as the brain or spinal cord, from such rabbits is attenuated by drying or chemical treatment and suspensions of such tissue of graded potency are injected to immunize the recipient against rabies. The injection of such nervous tissue in some cases produces highly undesirable side effects.

Rabies virus has previously been cultured outside living animals primarily in suspensions of minced nervous tissue as, for example, in mouse embryo brain or rabbit embryo brain. Prior workers with rabies virus in tissue culture have also generally found it necessary to add serum, plasma or the like proteinaceous fluids to their culture media in order to obtain reproduction of the virus. Plotz and Reagen (Science 95, 102–104 (1942)) have reported, for example, the culturing of a street virus strain of rabies employing chick embryo cells grown by the plasma clot method. The latter authors have indicated that the use of proliferating cells, such as are obtained in the plasma clot technique, is a requirement for obtaining rapid reproduction of the virus.

Another approach to the reproduction of rabies virus has been by adaptation of the virus to growth in embryonated eggs. The so-called Flury strain of rabies virus has found wide use in preparing vaccines for the immunization of dogs against rabies whereby said vaccine is grown in embryonated eggs. The Flury strain was isolated by passage of an original street virus through chick brains, and after serial intracerebral passage in baby chicks, was adapted to growth in embryonated eggs. The chick-embryo-adapted virus may be injected intramuscularly in dogs without producing rabies symptoms and yet fosters the production of rabies antibodies in the injected animal. Although such production of the Flury strain of rabies vaccine has advantages over older methods, it is handicapped by the retention of a high proportion of chicken protein in the finished vaccine and by the fact that it is difficult to remove contaminants such as other viruses or pleuro-pneumonia type organisms form virus propagated by egg passage. This process is further handicapped by the inherent expense involved in the production of vaccine in embryonated eggs.

It is an object of the present invention to provide a novel and improved rabies vaccine. It is a further object of the invention to provide a method for culturing modified live rabies virus in chick embryo tissue culture. A particular object is to provide a method for culturing such rabies virus in chick embryo tissue culture employing a culture medium free of serum or other proteinaceous additaments. Yet another object is to provide a rabies vaccine substantially free of undesirable contaminating viruses. Other objects will become apparent from the following specification and claims.

In accordance with the present invention, it has been discovered that modified live rabies virus, particularly the Flury strain of said virus, may be propagated in chick embryo tissue culture employing a synthetic maintenance medium without serum or other proteinaceous additament. It has further been discovered that the application of successive terminal dilution cultures in such tissue culture method produces a virus product substantially free of contaminating viruses and other organisms. It is among the advantages of the invention that vaccines produced in accordance therewith are substantially free of chick protein and have high antigenicity for producing immunization against rabies without undesirable side effects.

In carrying out the invention, egg-adapted, live modified rabies virus of the Flury strain is propagated in tissue cultures of embryonic chick cells. Said virus of the Flury strain has been adapted to be propagated in embryonated eggs after having been modified from the original street strain by 138 successive passages by intracerebral inoculation in chicks. In the preparation of tissue cultures, 7- to 10-day-old chick embryos are minced and dispersed in any suitable fashion to obtain a chick embryo cell dispersion. Portions of such dispersion are placed in culture vessels with a nutrient medium capable of supporting growth and multiplication of the cells and maintained under good growth conditions for such cells. As soon as good monolayer growth of chick embryo tissue cells is obtained, the nutrient medium is poured off and an inoculum of the aforementioned egg-adapted virus introduced into the tissue culture. A synthetic maintenance medium is added to each culture vessel, either before or after introducing the inoculum, in amount to cover the cell layers. The vessels are then maintained at a temperature of about 34°–37° C. for a period of time, usually from about 4 to 14 days, to accomplish multiplication of the virus.

The multiplication of rabies virus in chick embryo tissue culture is not evidenced by any observable cytopathological effect on the tissue cells. Growth of the virus is demonstrated by intracerebral inoculation into mice of serial dilutions of the fluid from the culture tubes following the above-described incubation of the virus.

The preferred mode of propagation and purification of the rabies virus for the preparation of vaccines includes one or more limiting dilution passages. In such technique, after it has been established by titering in mice that multiplication of the virus in tissue culture is proceeding, virus is harvested by freezing and thawing the incubated culture medium and cells about 5 to 14 days after inoculation with the virus, followed by separation of a clear, supernatant suspension of the virus freed of cell debris. The resulting virus suspension is diluted in successive 10-fold steps and a portion of each such dilution inoculated into chick embryo tissue culture in the above-described fashion. Thereafter, the inoculated culture tubes are maintained under conditions favorable to growth of the virus and tested periodically by intracerebral injection in mice to ascertain the presence or absence of rabies virus. Virus harvested from the culture prepared from the most dilute inoculum showing growth of the virus is then employed as the inoculum for further serial passages of the virus. In general, it is desirable to repeat serially such limiting dilution passages at least about 3 times and preferably, at least about 10 times, to assure the desired purification of the virus. Thereafter, the purified virus from the final limiting dilution passage may be multiplied by one or more further tissue culture passage to produce any desired quantity of vaccine.

In the preferred mode of operation, the chick embryo tissue cultures are prepared by mincing chick embryos after removing the eyes, and then dispersing the cells thereof by trypsinization. Portions of the resulting cell suspension are placed in culture vessels with a suitable nutrient medium, such as a solution of lactalbumin hydrolysate in Earle's basic salt solution fortified with an animal serum such as inactivated calf serum and containing suitable antibiotics to suppress bacterial contamination. When good monolayer growth of chick embryo tissue cells has been so obtained, the nutrient medium is decanted and the cell sheet of the tissue culture is wetted with an inoculum of the above-described egg-adapted Flury strain of rabies virus. In such operations, it appears critical for obtaining good yields of propagated virus to control the concentration of virus and/or egg material in the inoculum. Good results have been obtained when employing an inoculum consisting of a suspension of about 1 percent of embryo material from an active culture of the Flury strain of rabies virus in embryonated eggs.

In this preferred mode of operation, following the wetting of the chick embryo cell sheet with the suspension of active virus, the culture vessels are closed and maintained stationary for a period of time to promote absorption of the virus by the cells. Thereafter, a synthetic maintenance medium, such as medium 199 of Morgan, Morton and Parker, or Eagle's basal medium, is added to the inoculated culture vessel and such vessels are maintained at a temperature of about 35° for a period of about 4 to 14 days, preferably about 7 to 9 days, to accomplish multiplication of the virus. Subsequent passages of the resulting propagated virus may be carried out by the herein-described adsorption technique or by introducing a small quantity of harvested virus from a previous tissue culture passage into the culture tube along with or subsequent to the introduction of the synthetic maintenance medium. The term "synthetic maintenance medium" as employed herein refers to a medium composed of essential amino acids, purines, sugars, vitamins and inorganic salts capable of maintaining cultured cells in condition for multiplication of virus without supplements such as serum obtained from living animals.

For the preparation of vaccines, the virus produced by serial passage in chick embyro tissue culture, as described herein, may be harvested in any suitable fashion. In the preferred method of operation, the maintenance medium, containing a portion of the virus produced, is decanted from the tissue culture about 7 days after the inoculation of the tissue culture with the virus. Following the decantation, an equal volume of a suitable vaccine stabilizer, such as a casein hydrolysate, an amino acid-sugar mixture, a buffered sugar solution or the like, is introduced into the culture vessel and the contents thereof are then frozen and thawed to rupture the tissue cells and release the virus therefrom. The stabilizer fluid is then decanted, pooled with the prior harvest of mantenance medium and centrifuged to remove cell debris and produce a vaccine product. The latter can then be titered for potency and tested for purity in conventional fashion. If desired, such vaccine may be stored directly at low temperature or may be preserved in sealed vessels after freeze-drying.

In a representative operation, illustrative but not limiting of the invention, live rabies virus of the Flury strain, which is characterized as having been modified from the originally isolated street virus by 138 successive passages by intracerebral inoculation in chicks followed by 64 passages in embryonated eggs, was inoculated into tissue cultures of chick embyro cells. The tissue cultures were monolayer cultures grown in glass culture vessels. The culture material was prepared as follows.

Seven- to ten-day-old chick embryos were finely chopped under aseptic conditions, after removal of the eyes, and the resulting minced tissue washed with phosphite-buffered saline solution. The washed tissue was trypsinized in conventional fashion with agitation by a magnetic stirrer. The trypsinized tissue was centrifuged at 1000 r.p.m. for 3 minutes and the resulting concentrated cells were suspended in nutrient medium to provide about 500,000 to 600,000 cells per milliliter. The nutrient medium was prepared with Earle's basic salt solution consisting of sodium chloride 6.8 g., potassium chloride 0.4 g., calcium chloride 0.2 g., magnesium sulfate heptahydrate 0.2 g., monosodium acid phosphate monohydrate 0.125 g., glucose 1.0 g., sodium bicarbonate 2.2 g., and phenol red 0.02 g. dissolved in distilled water to make 1000 milliliters of finished solution. Said nutrient medium had the following composition:

| Ingredient: | Percent |
|---|---|
| Earle's basic salt solution (EBSS) | 85 |
| 5% solution of lactalbumin hydrolysate in EBSS without sodium bicarbonate | 10 |
| Inactivated calf serum | 5 |

The nutrient medium further contained 200 units of penicillin and 200 micrograms of streptomycin per milliliter.

One-milliliter portions of the above chick embryo cell suspension were placed in sterile tubes and maintained at a temperature of about 35° C. for 24 to 48 hours until a good growth of tissue was obtained. A similar procedure was also used to produce larger batches by incubating 60 to 70 milliliters of the cell suspension in Blake or Roux culture flasks. Following the initial incubation period for the chick embryo tissue cells, the nutrient medium was drained from the cell sheets and the latter washed with a synthetic maintenance medium, namely medium 199 of Morgan et al. (Proc. Soc. Experimental Biology and Medicine, 1950, 73, pp. 1–8), supplemented with 200 units of penicillin and 200 micrograms of streptomycin per milliliter. The wash medium was drained from the cell sheets of cultured tissue, and 0.2 milliliter of an aqueous suspension of 1 percent of embryo material from embryonated eggs, in which the Flury strain of rabies virus had been propagated, was added and distributed so as to contact the cell sheet. This egg virus material had a titer of $10^{6.3}$ mouse lethal doses per 0.2 milliliter as determined by intracerebral inoculation in mice. The culture tube and contents so treated were maintained at 35° C. for one hour, with the tubes held in a stationary position such that the inoculum covered the cell sheet. On completion of this adsorption period, 2 milliliters of medium 199 was added to the culture and the tube and contents placed in a roller drum and agitated slowly by rolling for seven days at a temperature of 35° C.

On the seventh day after the above inoculation of the tissue culture with the egg virus, the culture medium was frozen and thawed to release intracellular virus, and the resulting mixture was centrifuged to throw down cell debris. Two-tenths milliliter of the supernatant liquid from the centrifuged mixture was employed as the inoculum in fresh tubes of cultured tissue as before. After adsorption of the virus in the above-described manner, incubation was carried out for seven days at 35°, as previously. After six such passages, subsequent passages were made by inoculating 0.2 milliliter of supernatant virus-containing fluid from the immediately preceding passages into a fresh, washed, tissue culture containing 2 milliliters of maintenance medium. After 4 such additional passages, the supernatant liquid from the culture, after freezing and thawing, was titered by intracerebral inoculation in mice and found to have a titer of $10^{-4.2}$ per 0.03 milliliter. This passage level represented a dilution factor of $10^{-10.7}$ from the original starting virus.

Commencing at the 14th passage level, a series of blind, limiting-dilution, purification passages were made in the following manner. Fourteenth passage level virus was diluted in 10-fold steps and inoculated in 0.2 milliliter amounts into chick embryo cultures. At 7 days, the cultures inoculated with $10^{-1}$ and $10^{-2}$ dilutions were harvested by freezing and thawing the cell sheet in order to rupture the cells. At 10 days after inoculation, the cultures inoculated with $10^{-3}$ and $10^{-4}$ dilutions were harvested in a similar manner. All harvests were tested in mice for rabies virus. The cultures showing growth of mouse-infectious virus from the most dilute inoculum were used as seed which was diluted serially and passed into chick embryo tissue cultures as before. After eight such limiting-dilution purification passages, which represented a dilution factor of $10^{-46.5}$ from the original embryonated egg virus inoculum, the virus harvested from the eighth limiting-dilution passage titered $10^{-4.5}$ per 0.03 milliliter, or a $10^{45.5}$ increase in virus over the starting material. Ten such limiting-dilution passages were made to assure freedom of the final product from contaminating viruses and other microogranisms.

Bottles prepared from trypsinized chick embryo tissue are used for larger quantities of virus. Bottles were inoculated by adsorbing a mixture of 1.0 milliliter of virus suspension from a previous pasage and 9 milliliters of medium 199 to the cell sheet for one hour at 35° C. Then 90 milliliters of medium 199 were added and the bottles incubated stationary. Ten days after inoculation, the infectious supernatant fluid was removed and an equal quantity of a suitable stabilizer was added to the cell sheet which was then ruptured by freezing and thawing. Cell debris and stabilizer were combined with the supernatant fluid and centrifuged to remove cell debris to prepare a finished vaccine.

Other synthetic maintenance media, such as Parker and Healy's synthetic medium No. 858 or Eagle's medium, can be employed in the above procedure instead of medium 199, if desired.

Virus harvested from the 4th, 5th, 6th and 7th tissue culture passages, as described above, was pooled and employed as a vaccine for intramuscular injection in dogs. This pooled vaccine was found to have a titer of $10^{4.3}$ mouse lethal doses 50 percent ($MLD_{50}$) per milliliter. A dose of one milliliter of this vaccine was injected into each of 5 dogs and 6 similar dogs were maintained as uninoculated controls. About 8 weeks after the inoculation, all of the dogs were challenged by injection of a suspension of virulent rabies virus. All of the inoculated dogs survived in good condition while all of the uninoculated control dogs died.

To demonstrate the improved potency of vaccines prepared in accordance with the invention, particularly after purification by the above-described limiting-dilution technique, guinea pigs were inoculated intramuscularly with vaccines as follows:

(1) Standard commercial Flury strain vaccine from embryonated egg culture.
(2) Virus suspension from chick embryo tissue culture (TC) before limiting-dilution purification.
(3) Virus suspension from chick embryo tissue culture after 10 limiting-dilution passages.

A portion of each vaccine was diluted serially to give dilutions of $10^{-1}$, $10^{-2}$, $10^{-3}$ and $10^{-4}$, respectively, based on the undiluted vaccine. A group of guinea pigs was inoculated with the undiluted vaccine in each instance and further groups with each of the serial dilutions of the above-described vaccines. Each guinea pig received an injection of 0.25 milliliter of one of the vaccines or dilutions thereof intramuscularly. Other groups of similar guinea pigs were maintained uninoculated to serve as controls.

Twenty-one days after the inoculation, all the guinea pigs were challenged with a virulent street rabies virus by intramuscular injection of an amount of said virulent virus standardized to cause at least 80 percent mortality in unvaccinated guinea pigs. The guinea pigs were then held and observed for signs of paralysis. From the number of guinea pigs protected with each dilution of vaccine employed, the 50 percent protective end point for each vaccine was calculated by standard methods. The results are summarized in the following table.

| Vaccine Number | Source | Mouse doses ($MLD_{50}$) Required to Protect 50% of Guinea Pigs |
| --- | --- | --- |
| 1 | Embryonated egg | 242 |
| 2 | Chick embryo TC, Unpurified | 184 |
| 3 | Chick embryo TC, Purified | 35 |

Eighty-seven percent of the unvaccinated controls were paralyzed by the rabies challenge virus.

The foregoing results demonstrate the improved antigenicity of the rabies virus cultured on chick embryo tissues. This improved antigenicity was obtained with no increase in virulence of the virus for dogs or guinea pigs.

I claim:

1. A method for propagating a modified live rabies virus which comprises the steps of culturing chick embryo cells in vitro in a medium capable of fostering growth of such cells to produce monolayer tissue cultures, decanting the growth medium from the cultured cells, washing said cells with a protein-free nutrient medium, inoculating the cultured cells with an aqueous suspension of live rabies virus of the Flury strain which has been further modified by at least about 64 successive passages in embryonated eggs, adding to the cultured cells a synthetic maintenance medium selected from the group consisting of medium 199, medium 858 and Eagle's medium and maintaining the resulting culture at a temperature of from about 34° C. to 37° C. for a period of from about 4 to 14 days to accomplish multiplication of the virus in said cells.

2. A method according to claim 1 in which the inoculated culture is maintained at a temperature of about 35° C. for a period of seven days and thereafter, the modified live virus is harvested by decanting the maintenance medium, adding to the cell sheet a stabilizer selected from the group consisting of a solution of casein hydrolysate, a solution of an amino acid-sugar mixture and a buffered sugar solution, freezing and thawing the resulting mixture to rupture the cells and release virus therefrom, combining the resulting virus suspension in stabilizer with the decanted maintenance medium and separating the combined virus suspension from the cells and cell debris by centrifugation.

3. The method of claim 2 wherein the harvested virus is freeze-dried to produce a vaccine concentrate.

4. A method for propagating a modified live rabies virus which comprises the steps of culturing chick embryo cells in vitro in a medium capable of fostering growth of such cells to produce monolayer tissue cultures, decanting the growth medium from the cultured cell sheet, washing said cells with a protein-free nutrient medium, wetting said cell sheet with a minimal quantity of an aqueous suspension of the modified live rabies virus, maintaining said suspension in contact with the cell sheet for a period of time at a temperature of from about 34° C. to about 37° C. to accomplish adsorption of the virus by the cells, adding a maintenance medium selected from the group consisting of medium 199, medium 858 and Eagle's medium to cover the cell sheet and maintaining the culture at a temperature of about 35° C. for a period of from about 4 to 14 days to accomplish multiplication of the virus in said cells.

5. A method according to claim 4 wherein the inoculated culture with maintenance medium is held at a temperature of about 34° C. to 37° C. for a period of from about 4 to 14 days and thereafter, a suspension of the virus is harvested from the culture by decanting the maintenance medium, adding to the cell sheet a stabilizer selected from the group consisting of a solution of casein hydrolysate, a solution of an amino acid-sugar mixture and a buffered sugar solution, freezing and thawing the resulting mixture to rupture the cells and release virus therefrom, combining the resulting virus suspension in stabilizer with the decanted maintenance medium and separating the combined virus suspension from the cells and cell debris by centrifugation.

6. A method according to claim 4 wherein the inoculated culture with maintenance medium is held at a temperature of about 35° C. for a period of from about 7 to 9 days and thereafter, a suspension of the virus is harvested from the culture by decanting the maintenance medium, adding to the cell sheet a stabilizer selected from the group consisting of a solution of casein hydrolysate, a solution of an amino acid-sugar mixture and a buffered sugar solution, freezing and thawing the resulting mixture to rupture the cells and release virus therefrom, combining the resulting virus suspension in stabilizer with the decanted maintenance medium and separating the combined virus suspension from the cells and cell debris by centrifugation.

7. A method for preparing a modified live rabies virus vaccine which comprises the steps of inoculating the Flury strain of rabies virus further modified by at least about 64 successive passages in embryonated eggs into a culture of chick embryo cells, maintaining the inoculated culture for a period of time to accomplish multiplication of the virus, harvesting virus from such culture, preparing serial, successive, 10-fold dilutions of the harvested virus, inoculating each such dilution into a fresh chick embryo tissue culture, harvesting virus from the culture prepared from the most dilute inoculum from which reproduction of the virus can be demonstrated by intracerebral inoculation in mice, employing the resulting harvested virus as seed for the next series of dilution passages and repeating such limiting dilution tissue culture passages for a total of at least about 10 such passages, maintaining the final tissue culture from the most dilute inoculum from which reproduction of the virus can be demonstrated until substantial multiplication of the virus therein is obtained and harvesting therefrom a modified live rabies virus substantially free of contaminating viruses and other organisms.

8. A method according to claim 7 wherein the virus harvested from the final limiting dilution passage is multiplied in at least one further chick embryo tissue culture passage wherein an established monolayer tissue culture of chick embryo cells is washed with a protein-free nutrient medium, the resulting washed cell sheet is inoculated with said virus, a synthetic maintenance medium selected from the group consisting of medium 199, medium 858 and Eagle's medium is added thereto, the resulting culture is maintained at a temperature of from about 34° to 37° C. for a period of from about 4 to 14 days and the propagated virus harvested by decanting the maintenance medium, adding to the cell sheet a stabilizer selected from the group consisting of a solution of casein hydrolysate, a solution of an amino acid-sugar mixture and a buffered sugar solution, freezing and thawing the resulting mixture to rupture the cells and release virus therefrom, combining the resulting virus suspension in stabilizer with the decanted maintenance medium and separating the combined virus suspension from the cells and cell debris by centrifugation to produce a vaccine.

9. A modified live rabies vaccine substantially free of proteinaceous additaments and of contaminating viruses prepared by the method of claim 7.

10. A modified live rabies vaccine prepared by the steps of culturing chick embryo cells in vitro in a medium capable of fostering growth of such cells to produce monolayer tissue cultures, decanting the growth medium from the cultured cells, washing said cells with a protein-free maintenance medium, inoculating the cultured cells with an aqueous suspension of live rabies virus of the Flury strain, further modified by at least about 64 successive passages in embryonated eggs, adding to the cultured cells a synthetic maintenance medium selected from the group consisting of medium 199, medium 858 and Eagle's medium, maintaining the resulting culture at a temperature of from about 34° C. to 37° C. for a period of time to accomplish multiplication of the virus in said cells and harvesting the virus by decanting the maintenance medium, adding to the cell sheet a stabilizer selected from the group consisting of a solution of casein hydrolysate, a solution of an amino acid-sugar mixture and a buffered sugar solution, freezing and thawing the resulting mixture to rupture the cells and release virus therefrom, combining the resulting virus suspension in stabilizer with the decanted maintenance medium and separating the combined virus suspension from the cells and cell debris by centrifugation.

References Cited by the Examiner

UNITED STATES PATENTS

| | | | |
|---|---|---|---|
| 2,768,114 | 10/1956 | Koprowski et al. | 167—78 |
| 2,965,544 | 12/1960 | Cabasso | 167—78 |
| 3,080,291 | 3/1963 | Sinha et al. | 167—78 |
| 3,143,470 | 8/1964 | Wilner | 167—78 |

OTHER REFERENCES

Fenje: "Propagation of Rabies Virus in Cultures of Hamster Kidney Cells," Canad. Jl. Microb., vol. 6, No. 5, pp. 479–484, October 1960.

Fenje: "A Rabies Vaccine From Hamster Kidney Tissue Cultures: Preparation and Evaluation in Animals," Canad. Jl. Microb., vol. 6, pp. 605–609, December 1960.

Kaplan et al.: "An Indicator Plaque-Forming System for Demonstration of Interference by Non-Cytocidal Strains of Rabies Virus," Nature, vol. 186, No. 4727, pp. 821–822, June 4, 1960.

Kaplan et al.: "Demonstration of Rabies Virus in Tissue Culture With Fluorescent Antibody Technique," Bulletin WHO, vol. 22, No. 3–4, pp. 434–435, 1960.

Kissling: "Growth of Rabies Virus in Non-Nervous Tissue Culture," Proc. Soc. Exp. Biol. & Med., vol. 98, No. 2, pp. 223–225, June 1958.

Nomura et al.: "Growth of Rabies Virus and Development of Antigen in Culture of Chick Embryo Fragments," Japanese Jl. Vet. Sci., vol. 21, No. 6, pp. 112–113, December 1959 (in Japanese), per Biological Abstracts, vol. 35, No. 24, entry #71122, Dec. 15, 1960.

Ott: "Preliminary Trials of a New Tissue Culture Rabies Vaccine," Vet. Med. 57 (2), pp. 158–159 (1962).

Walker et al.: "The Immunizing Value of High Egg Passage Flury Rabies Virus and Its Use in Combination With the Virus of Canine Distemper," Canad. Jour. Comp. Med. & Vet. Sci., vol. 23, No. 2, pp. 50–55, 1959.

LEWIS GOTTS, *Primary Examiner.*

IRVING MARCUS, *Examiner.*

SHEP K. ROSE, *Assistant Examiner.*